US010756452B2

(12) United States Patent
Saeed (10) Patent No.: US 10,756,452 B2
(45) Date of Patent: Aug. 25, 2020

(54) ELECTRICAL CONNECTOR WITH SHEARABLE FASTENER

(71) Applicant: Hubbell Incorporated, Shelton, CT (US)

(72) Inventor: Dana Khalid Saeed, Manchester, NH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/206,637

(22) Filed: Nov. 30, 2018

(65) Prior Publication Data

US 2019/0165498 A1    May 30, 2019

Related U.S. Application Data

(60) Provisional application No. 62/719,425, filed on Aug. 17, 2018, provisional application No. 62/592,711, filed on Nov. 30, 2017.

(51) Int. Cl.
| | |
|---|---|
| *H01R 13/58* | (2006.01) |
| *H01R 4/36* | (2006.01) |
| *H01R 43/04* | (2006.01) |
| *F16B 31/02* | (2006.01) |
| *H01R 4/30* | (2006.01) |
| *H01R 11/28* | (2006.01) |
| *H01R 11/09* | (2006.01) |

(52) U.S. Cl.
CPC ............. *H01R 4/36* (2013.01); *F16B 31/021* (2013.01); *H01R 43/04* (2013.01); *H01R 4/307* (2013.01); *H01R 11/09* (2013.01); *H01R 11/28* (2013.01)

(58) Field of Classification Search
CPC ................................ H01R 11/15; H01R 13/50
USPC .................................. 439/475, 797, 813, 814
See application file for complete search history.

(56) References Cited

U.S. PATENT DOCUMENTS

| | | | |
|---|---|---|---|
| 5,927,917 A | 7/1999 | Gibbons | |
| 6,042,430 A | 3/2000 | Hollick | |
| 7,214,108 B2 | 5/2007 | Barnett | |
| 7,717,658 B2 | 5/2010 | Peltier | |
| 8,550,842 B1 | 10/2013 | Gutierrez et al. | |
| 8,747,170 B2 | 6/2014 | Cornelius et al. | |
| 9,366,282 B2 | 6/2016 | Vallette et al. | |
| 9,837,730 B1 * | 12/2017 | Rahman | ............... H01R 4/2408 |
| 2008/0039848 A1 | 2/2008 | Jackson | |
| 2014/0322990 A1 | 10/2014 | Umlauf et al. | |
| 2015/0155640 A1 | 6/2015 | Frank | |

FOREIGN PATENT DOCUMENTS

EP        2375502 B2    12/2014

OTHER PUBLICATIONS

PCT/US2018/063406 International Search Report and Written Opinion dated Mar. 4, 2019 (13 pages).

* cited by examiner

*Primary Examiner* — Phuong K Dinh
(74) *Attorney, Agent, or Firm* — Michael Best & Friedrich, LLP (57) ABSTRACT

A fastener for connecting an electrical conductor to a connector body includes a first portion adapted to engage an opening of the connector body and a second portion engaging the first portion. The second portion includes a head, a base coupled to the first portion and including an end adapted to engage the electrical conductor, and a shearable section positioned between the head and the base.

22 Claims, 14 Drawing Sheets

ELECTRICAL CONNECTOR WITH SHEARABLE FASTENER

REFERENCE TO RELATED APPLICATIONS

This application claims the benefit of U.S. Provisional Patent Application No. 62/592,711, filed Nov. 30, 2017, and U.S. Provisional Patent Application No. 62/719,425, filed Aug. 17, 2018. The entire contents of these applications are incorporated by reference.

BACKGROUND

The present disclosure relates to a fastener for coupling and electrically connecting electrical conductors, and more particularly to a shearable bolt positioned within a connector block for maintaining electrical contact with at least one electrical conductor.

SUMMARY

In one independent aspect, a fastener for connecting an electrical conductor to a connector body includes a first portion adapted to engage an opening of the connector body and a second portion engaging the first portion. The second portion includes a head, a base coupled to the first portion and including an end adapted to engage the electrical conductor, and a shearable section positioned between the head and the base.

In some aspects, the base is threadable into the first portion to progressively insert the end into the connector body until the end contacts an outer surface of the electrical conductor.

In some aspects, the first portion includes an outer surface having a threaded section and a non-threaded section, the non-threaded section providing a stop to prevent over insertion of the first portion into the opening beyond a predetermined point.

In some aspects, the non-threaded section is configured to position an upper end of the first portion flush with the outer surface of the connector body.

In some aspects, an end of the base includes a flange, and the flange engages an upper end of the first portion for rotating the first portion and the second portion together.

In some aspects, the flange is separable from the base due to threading the second portion relative to the first portion after the first portion is inhibited from further rotation, and the second portion is further threadable into the first portion after the flange is separated from the base.

In some aspects, a fixed break off point is positioned at an end of the shearable section and adjacent the base, and the head separates from the base at the fixed break off point when a predetermined torque limit is reached.

In some aspects, the shearable section includes an aperture and the base includes a corresponding aperture, and a shear pin extends through the apertures, and the shear pin is configured to shear when an upper end of the first portion is positioned adjacent an outer surface of the connector body, thereby allowing rotation of the second portion relative to the first portion.

In some aspects, the head includes at least one of an outer hex profile and a socket, and the fastener is configured to be rotated by a drive tool engaging at least one of the outer hex profile and the socket.

In some aspects, the head includes an inner surface defining a socket, the socket extending from an end surface of the head, through the shearable section, and partially through the base to facilitate removal of the base from the connector body after the head has separated from the base.

In some aspects, at least a portion of an inner surface of the first portion includes threads, and an outer surface of the base includes threads for threadably engaging the threads on the inner surface of the first portion.

In some aspects, the first portion includes an end surface positioned proximate the opening of the connector body, and the end surface includes at least one feature configured to receive a tool to facilitate rotation of the first portion relative to the connector body.

In another independent aspect, an electrical connector includes a connector body and a fastener. The connector body includes at least one bore for receiving an electrical conductor, and at least one opening in communication with the bore. The fastener is coupled to the opening of the connector body, and the fastener includes a first portion and a second portion. The first portion is adapted to engage an opening of the connector body, and the second portion includes a head, a base coupled to the first portion, and a shearable section positioned between the head and the base. The base includes an end adapted to engage the electrical conductor.

In some aspects, the first portion includes an outer surface having a threaded section and a non-threaded section, the non-threaded section providing a stop to prevent over insertion of the first portion into the opening beyond a predetermined point.

In some aspects, an end of the base includes a flange, wherein the flange engages an upper end of the first portion for rotating the first portion and the second portion together.

In some aspects, the flange is separable from the base due to threading the second portion relative to the first portion after the first portion is inhibited from further rotation, and the second portion is further threadable into the first portion after the flange is separated from the base.

In some aspects, a fixed break off point is positioned at an end of the shearable section and adjacent the base, and the head separates from the base at the fixed break off point when a predetermined torque limit is reached.

In some aspects, the head includes an inner surface defining a socket, the socket extending from an end surface of the head, through the shearable section, and partially through the base to facilitate removal of the base from the connector body after the head has separated from the base.

In some aspects, the first portion includes an end surface positioned proximate the opening of the connector body, the end surface including at least one feature configured to receive a tool to facilitate rotation of the first portion relative to the connector body.

In yet another independent aspect, a method of connecting an electrical conductor to a connector body includes: co-rotating a first portion and a second portion of a fastener to insert the first portion into an opening of the connector body, until an upper end of the first portion is substantially flush with an outer surface of the connector body; further inserting the second portion relative to the first portion until a base end of the second portion engages the electrical connector; and shearing a head of the second portion from a base of the second portion along a predetermined shear section.

In some aspects, the method further includes inhibiting rotation of the first portion when a non-threaded section of the first portion is adjacent an outer surface of the connector body.

In some aspects, an end of the base includes a flange, and the flange engages an upper end of the first portion to couple the first portion and the second portion for co-rotation.

In some aspects, the method includes breaking the flange from the base when the upper end of the first portion is substantially flush with the outer surface of the connector body.

In some aspects, after breaking the flange, the second portion rotates relative to the first portion to progressively insert the second portion through the first portion.

Other aspects will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
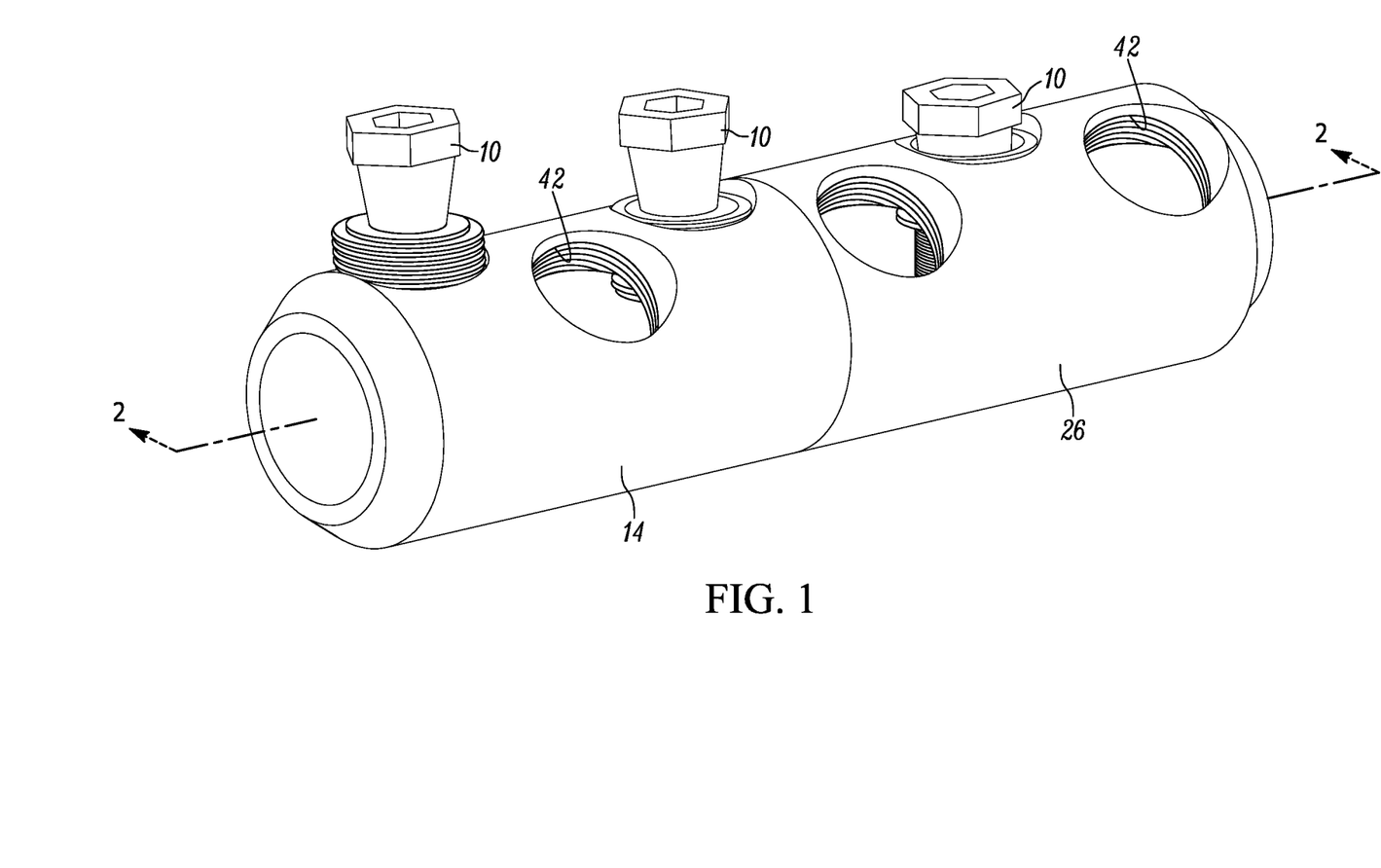
FIG. 1 is a perspective view of a connector including fasteners and a connector block.
Figure 2:
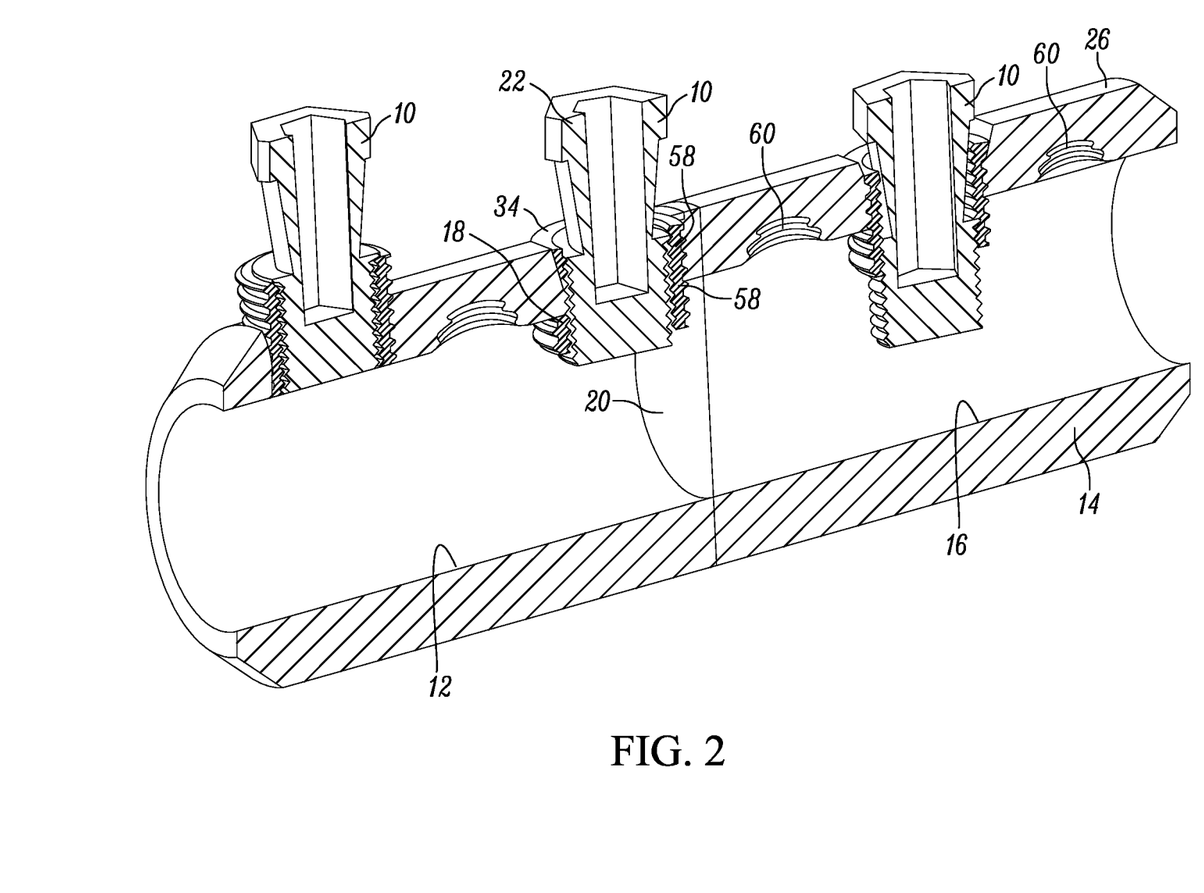
FIG. 2 is a cross-sectional view of the fasteners and connector block of FIG. 1, viewed along section 2-2.

FIGS. 1-7 illustrate a connector including a connector body or block 14 and a fastener 10 for connecting an electrical conductor 6 (FIG. 8) to the connector block 14 (FIGS. 1 and 2). The fastener 10 includes a first portion 18 and a second portion 22 positioned within the first portion 18. The fastener 10 is configured to be inserted at least partially through an outer surface 26 of the connector block 14 to engage the electrical conductor 6 (FIG. 8) positioned within the connector block 14. More specifically, the first portion 18 is coupled to the connector block 14 and the second portion 22 is telescopically coupled to the first portion 18 for selective movement of the second portion 22 relative to the first portion 18. In the illustrated embodiment, the connector block 14 includes a first bore 12 and a second bore 16, and an inner wall 20 partitions the first bore 12 from the second bore 16. Among other things, the inner wall 20 provides a mechanical stop for electrical conductors 6a, 6b (FIG. 8) inserted into the first bore 12 and the second bore 16 to insure proper positioning of the conductors 6a, 6b and also to prevent leakage of fluid (e.g. oil) when connecting fluid impregnated conductors.

With reference to FIGS. 1-5, in the illustrated embodiment the first portion 18 includes a cylindrical body 30 having a first or upper end 34 and a second or lower end 38 opposite the upper end 34. The cylindrical body 30 is adapted to engage openings 42 positioned on the outer surface 26 of the connector block 14 (FIG. 1). The first portion 18 further includes an inner surface 46 and an outer surface 50. Each of the inner surface 46 and the outer surface 50 extends between the upper end 34 and the lower end 38.

Figure 4:
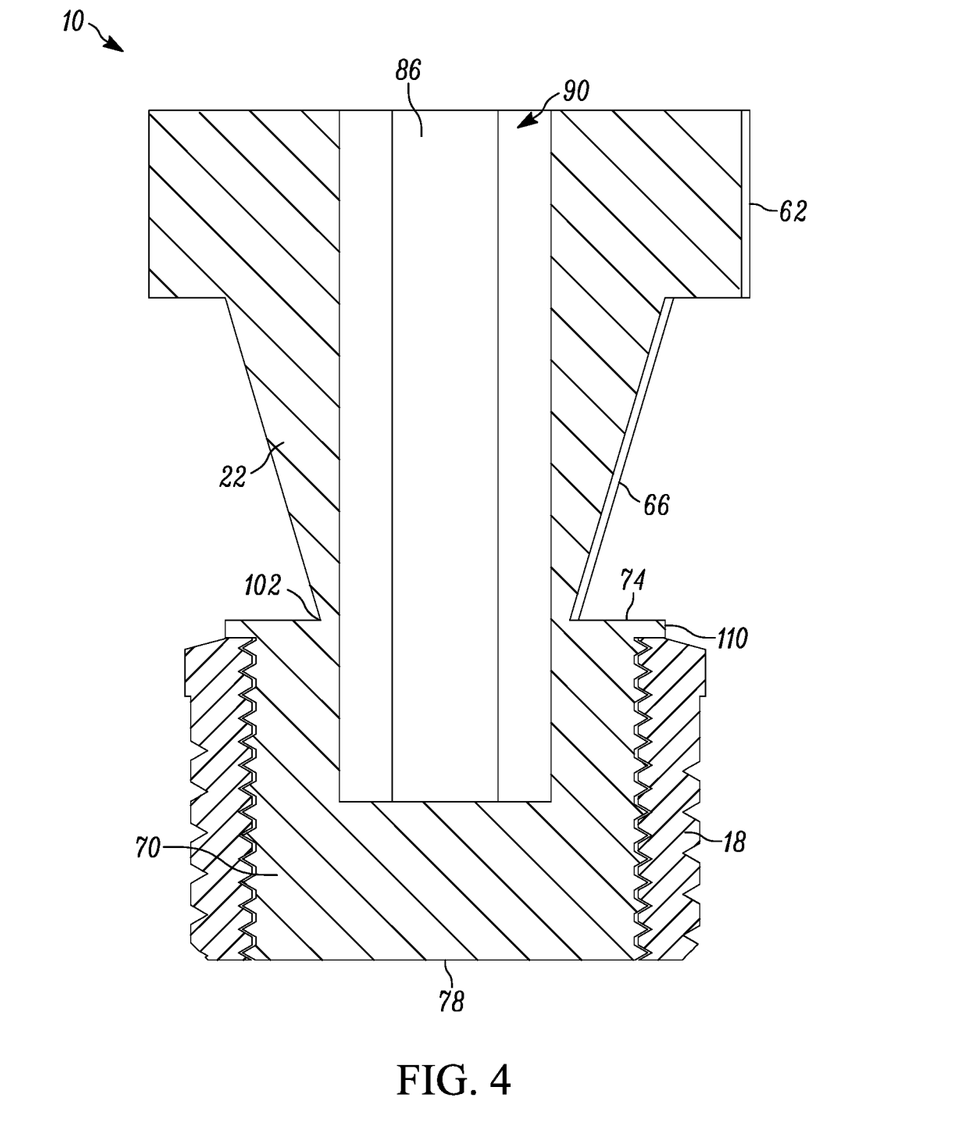
FIG. 4 is a cross-sectional view of the fastener of FIG. 3A viewed along section 4-4.
Figure 5:
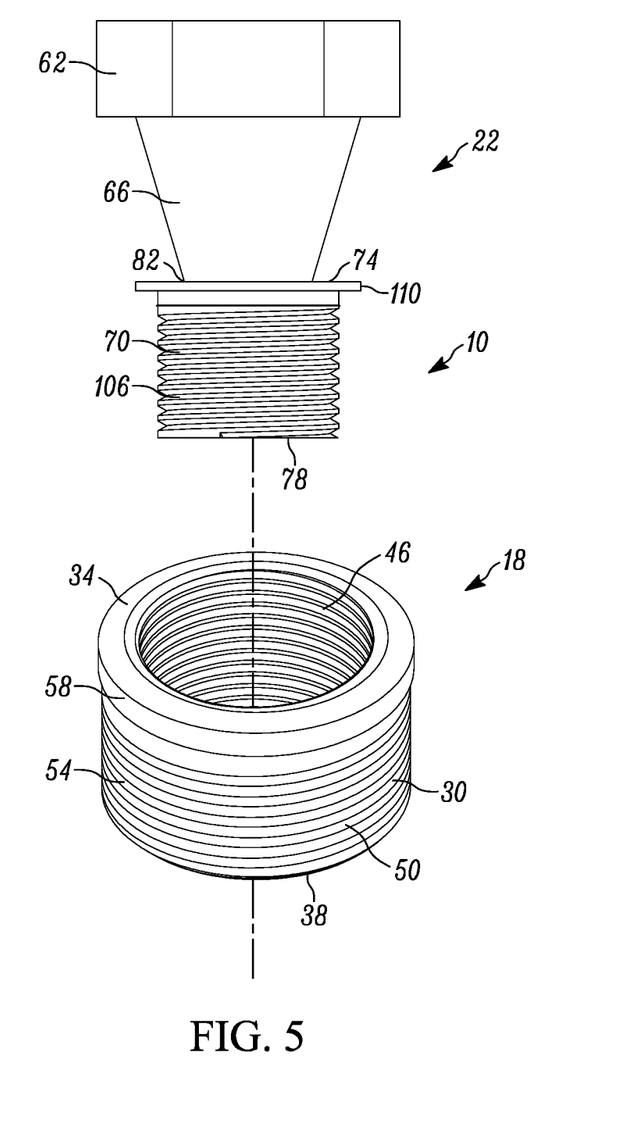
FIG. 5 is an exploded view of the fastener of FIG. 3A.
Figure 6:
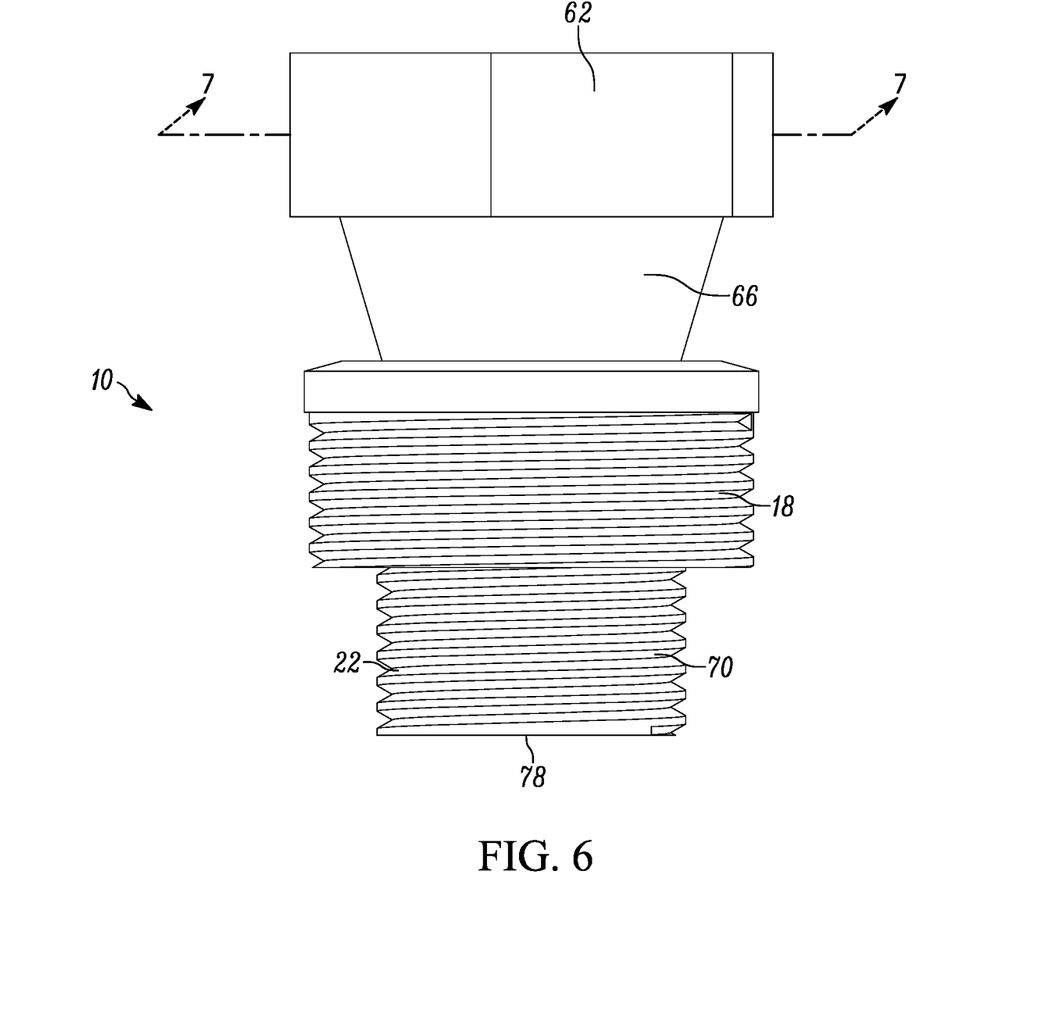
FIG. 6 is an elevation view of the fastener of FIG. 3A with the first portion in a second position relative to the second portion of the fastener.

As shown in FIGS. 2 and 4-5, the outer surface 50 includes a threaded section 54 and a non-threaded section 58. The non-threaded section 58 is positioned adjacent the upper end 34, while the threaded section 54 is positioned adjacent the lower end 38. In the illustrated embodiment, the threaded section 54 of the outer surface 50 threadably engages threads 60 of the openings 42 of the connector block 14. Threading the first portion 18 into one of the openings 42 inserts the first portion 18 into the outer surface 26 of the connector block 14.

With reference to FIG. 2, once the non-threaded section 58 engages the threads 60 of the opening 42, the first portion 18 will stop inserting into the opening 42. In the illustrated embodiment, the non-threaded section has a length that is configured to position the upper end 34 of the first portion 18 flush with the outer surface 26 of the connector block 14. In other words, the first portion 18 can be threaded into one of the openings 42 to progressively insert the first portion 18 into the connector block 14 until the non-threaded section 58 is reached. The non-threaded section 58 is configured to inhibit rotation of the first portion 18 relative to the connector block 14 when the non-threaded portion 58 is adjacent (i.e., flush with) the outer surface 26 of the connector block 14.

Figure 3A:
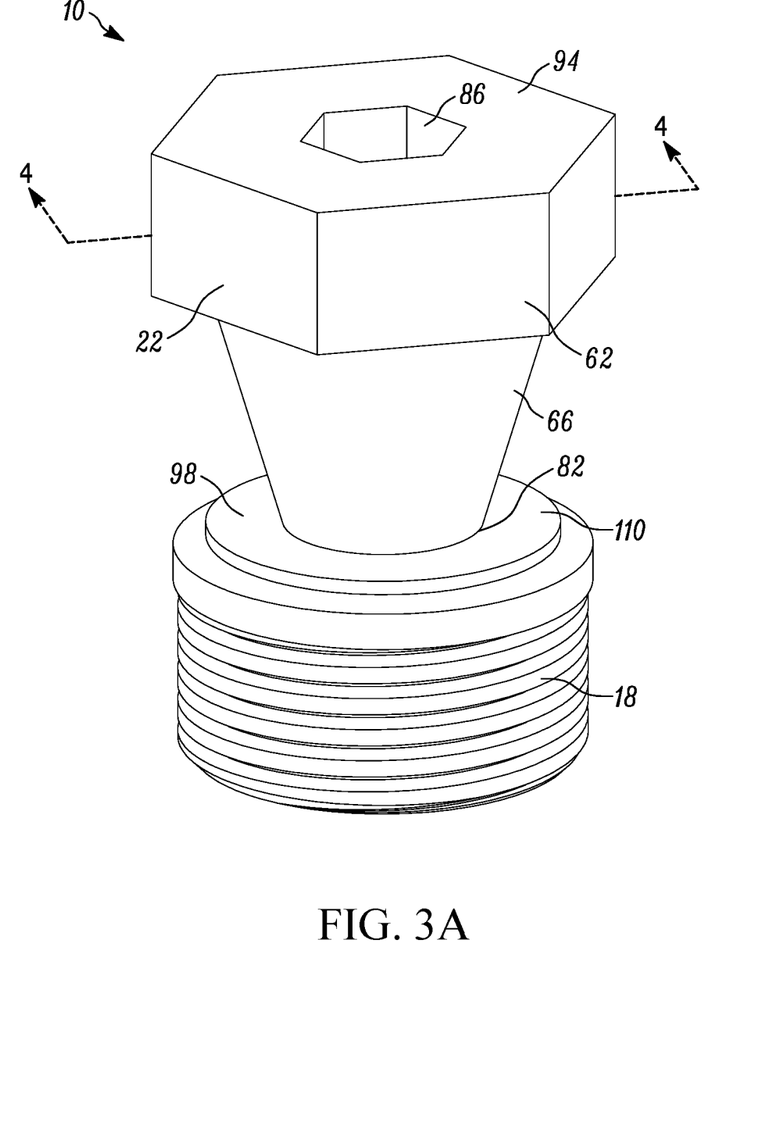
FIG. 3A is a perspective view of the fastener of FIG. 1 with a first portion in a first position relative to a second portion of the fastener.

With reference to FIGS. 3A, 4, and 5, the second portion 22 includes a head 62, a base 70, and a shearable section 66 positioned between the head 62 and the base 70. The illustrated shearable section 66 extends from a lower end of the head 62 to a first or upper end 74 of the base 70. Furthermore, the shearable section 66 includes an end 82 adjacent the upper end 74 of the base 70. The illustrated shearable section 66 tapers from the head 62 to the end 82. The head 62 is configured to be rotated by a drive tool (not shown) for inserting the fastener 10 into one of the openings 42 of the connector block 14.

With reference to FIGS. 3A and 4, the illustrated head 62 includes a hex shape and an inner surface 86 defining a socket 90. In other embodiments, the head 62 may include either the hex shape or the socket. The head 62 is configured to be rotated by the drive tool for inserting the first portion 18 and the second portion 22 into one of the openings 42.

The drive tool can be a hex key (e.g., Allen wrench) that is configured to engage the hex shape of the fastener 10, and/or a socket wrench that is configured to engage the socket 90.

The socket 90 extends from an upper surface 94 of the head 62 through an upper surface 98 at the first end 74 of the base 70. The socket 90 is configured to facilitate removal of the base 70 from one of the openings 42 of the connector block 14 after the head 62 has been separated from the base 70. In other words, the upper surface 98 of the base 70 includes the socket 90 for removal of the fastener 10 by the drive tool after the head 62 has sheared from the base 70.

As shown in FIG. 4, the shearable section 66 includes a fixed break off point 102 positioned at the end 82 of the shearable section 66 adjacent the base 70. The head 62 is configured to separate from the base 70 at the fixed break off point 102. Specifically, the drive tool applies a torque to the fastener 10 until the applied torque reaches a predetermined torque limit of the fixed break off point 102. Subsequently, the torque applied by the drive tool separates (i.e., shears) the head 62 from the base 70 at the break off point 102 (FIG. 4). In some embodiments, the socket 90 may include a blocking member (not shown) positioned within the head 62 (i.e., in the socket 90 between the upper surface 94 of the head 62 and the upper surface 98 of the base 70). The blocking member may be a rubber insert, a projection extending from the inner surface 86 of the socket 90, or another blocking feature. The blocking member is configured to inhibit insertion of the drive tool (e.g., Allen wrench) completely within the socket 90 such that the torque is applied to the head 62 of the fastener 10 and not to the base 70. As such, the blocking member may ensure that the fastener 10 shears at the fixed break off point 102 when the predetermined torque limit is reached.

Figure 8:
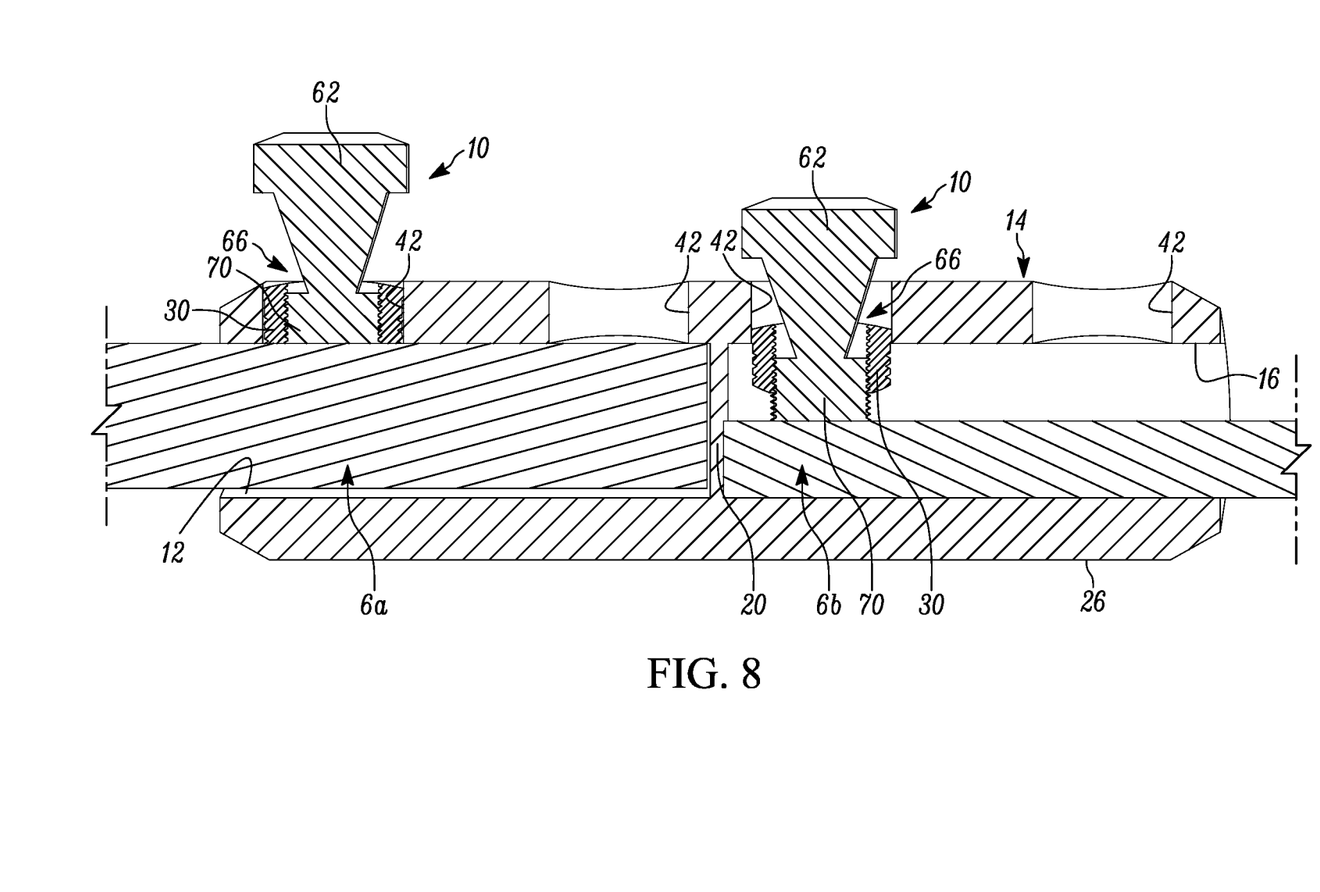
FIG. 8 is a cross-sectional view of the fasteners and connector block of FIG. 1 viewed along section 2-2, with electrical conductors positioned in the connector block.

With reference to FIGS. 2-5, the base 70 includes an outer surface 106 extending from the first end 74 to the second end 78. The outer surface 106 includes threads for threadably engaging threads on the inner surface 46 of the first portion 18 (FIG. 5). In some embodiments, the inner surface 46 of the first portion 18 includes threads extending between the upper end 34 and the lower end 38; in other embodiments, only a portion of the inner surface 46 may include threads. As such, the second portion 22 is configured to move relative to the first portion 18. Furthermore, the second end 78 of the base 70 is adapted to engage the electrical conductor 6 (FIG. 8). In other words, the base 70 can be threaded into the first portion 18 to progressively insert the second end 78 into the connector block 14 until the second end 78 contacts an outer surface of the electrical conductor 6 (FIG. 8). More specifically, rotation of the second portion 22 relative to the first portion 18 progressively inserts the second portion 22 through the first portion 18. As such, the fastener 10 can be adjusted to engage and provide electrical contact with electrical conductors of different sizes (i.e., different outer diameters, width, shape, circumference, etc.).

Figure 3B:
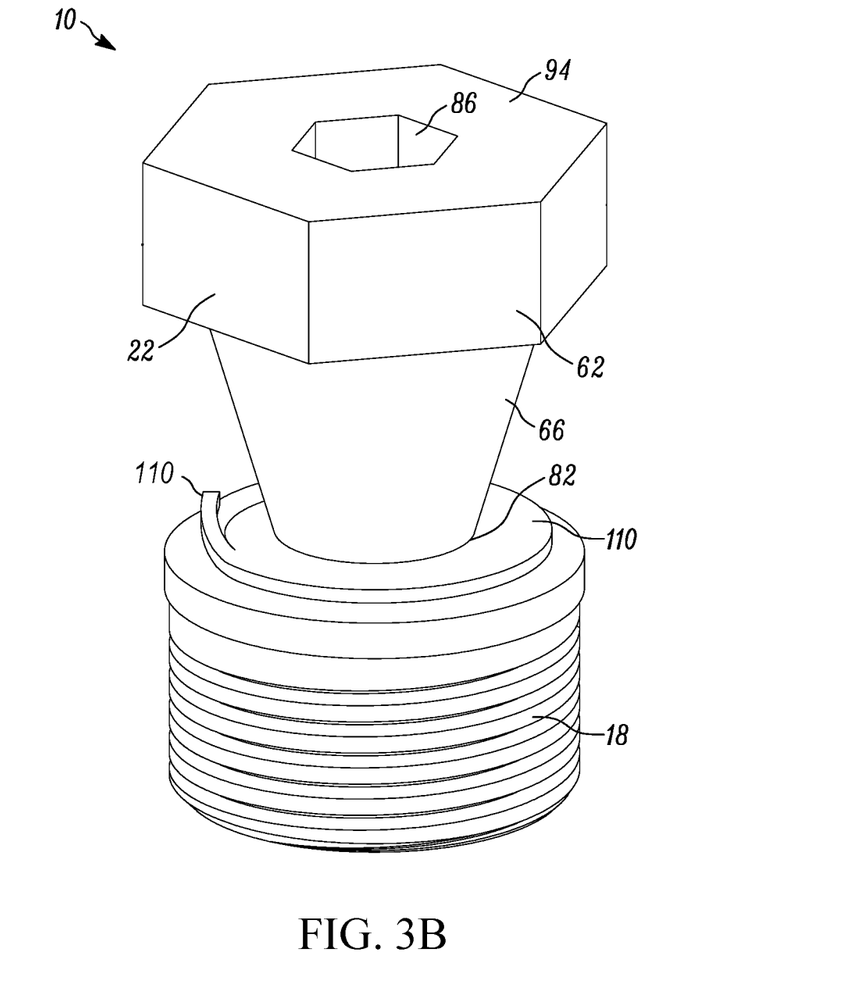
FIG. 3B is a perspective view of the fastener of FIG. 1 with a with a portion of a flange separated.
Figure 7:
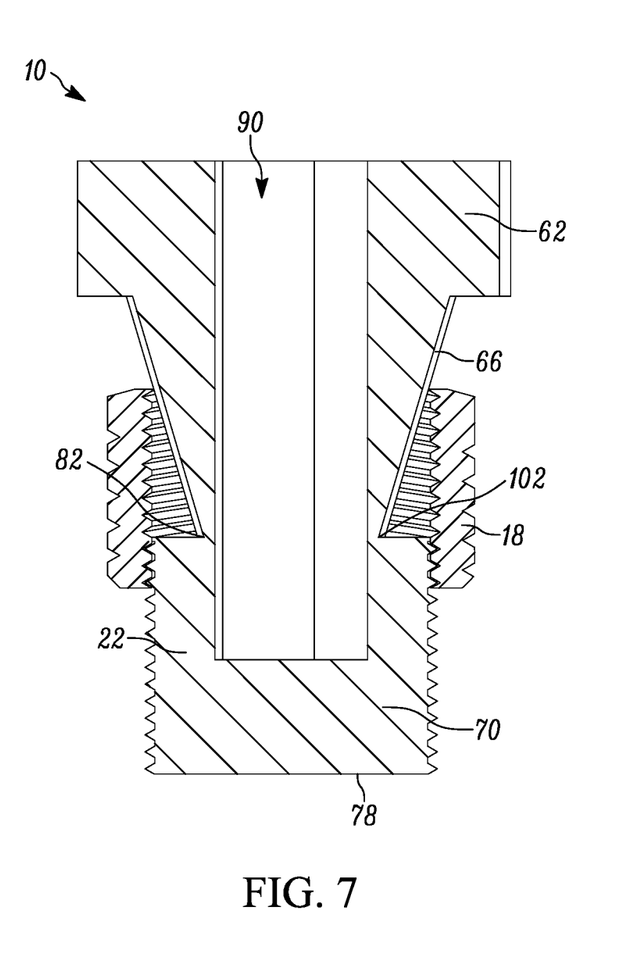
FIG. 7 is a cross-sectional view of the fastener of FIG. 6 viewed along a longitudinal section.

With reference to FIGS. 4 and 7, the first end 74 of the base 70 further includes a flange 110. The flange 110 engages the upper end 34 of the first portion 18 for rotating the first portion 18 and the second portion 22 together. The first and second portions 18, 22 are co-rotatable until the non-threaded section 58 of the first portion 18 reaches the threads 60 of one of the openings 42 (i.e., when the upper end 34 of the first portion 18 is flush with the outer surface 26 of the connector block 14), thereby inhibiting rotation of the first portion 18 (FIG. 4). Application of additional torque to the fastener 10 causes the flange 110 to shear or break off or separate from the base 70 (FIG. 3B). Subsequently, the second portion 22 can rotate relative to the first portion 18.

As shown in FIGS. 2, 4, and 7, in operation, the fastener 10 is positioned within one of the openings 42 of the connector block 14. Initially, the flange 110 of the base 70 couples the first and second portions 18, 22 together for co-rotation at least in an insertion direction. The drive tool (not shown) applies a torque to the head 62 for insertion of the fastener 10 into the connector block 14 due to the engagement of the threads of the outer surface 50 of the first portion 18 and the threads 60 of one of the openings 42. The applied torque rotates the fastener 10 to progressively insert the first portion 18 into the connector block 14 until the non-threaded section 58 is reached, thereby positioning the upper end 34 of the first portion 18 substantially flush with the outer surface 26 of the connector block 14.

As a user continues to apply torque, the flange 110 breaks off of the base 70 and the second portion 22 begins to rotate relative to the first portion 18. The base 70 of the second portion 22 extends from the first portion 18 towards the electrical conductor 6 (FIG. 8) by rotation of the base 70 relative to the inner surface 46 of the first portion 18. The predetermined torque limit is reached when the second end 78 of the base 70 engages the electrical conductor 6. As such, the fastener 10 is configured to electrically connect the connector block 14 to the electrical conductor 6 using the first portion 18 and the base 70 of the second portion 22. Upon application of additional torque, the head 62 shears from the base 70 at a predetermined fault feature (e.g., the shearable section 66). In the illustrated embodiment, the shearable section 66 is recessed relative to an outer surface 26 of the connector block 14, thereby avoiding the need to file down any sharp protrusions or wrap a material around the connector block 14. In addition, the shearing of the head 62 provides a positive indication that the fastener 10 has been correctly installed and is sufficiently tightened. The base 70 includes the socket 90 for facilitating ease of removal of the fastener 10 from the connector block 14 once the fastener 10 has been installed (i.e., once the head 62 shears from the base 70).

As shown in FIG. 8, the fastener 10 is adaptable to engage electrical conductors 6a, 6b having different sizes. Specifically, the first portion 18 moves relative to the connector block 14 and the second portion 22 selectively moves relative to the first portion 18 for accommodating a range of sizes of the electrical conductors 6a, 6b. For example, a first electrical conductor 6a has a relatively large size compared to a second electrical conductor 6b, and the second end 78 of the base 70 engages the first electrical conductor 6a before the flange 100 breaks off of the base 70. By comparison, the second electrical conductor 6b has a relatively small size such that the second end 78 of the base 70 engages the electrical conductor 6b after the flange 110 separates from the base 70, and after the second portion 22 extends relative to the first portion 18. As such, the fastener 10 can engage and maintain electrical contact with electrical conductors having different sizes. The fastener 10 provides electrical communication between the electrical conductors 6a, 6b and, at least in some cases, the connector block 14. In other embodiments, an electrical conductor may have an intermediate size, and the second end 78 of the base 70 engages the electrical conductor after the flange 110 separates from the base 70, but before the second portion 22 extends relative to the first portion 18.

In some embodiments, an inner surface of the connector block 14 may have a knurled inner bore to break through oxide layers on the electrical conductors 6 and grip the conductors. In some embodiments, an oxide inhibitor may be used to abrade and penetrate the conductor oxides.

Figure 9:
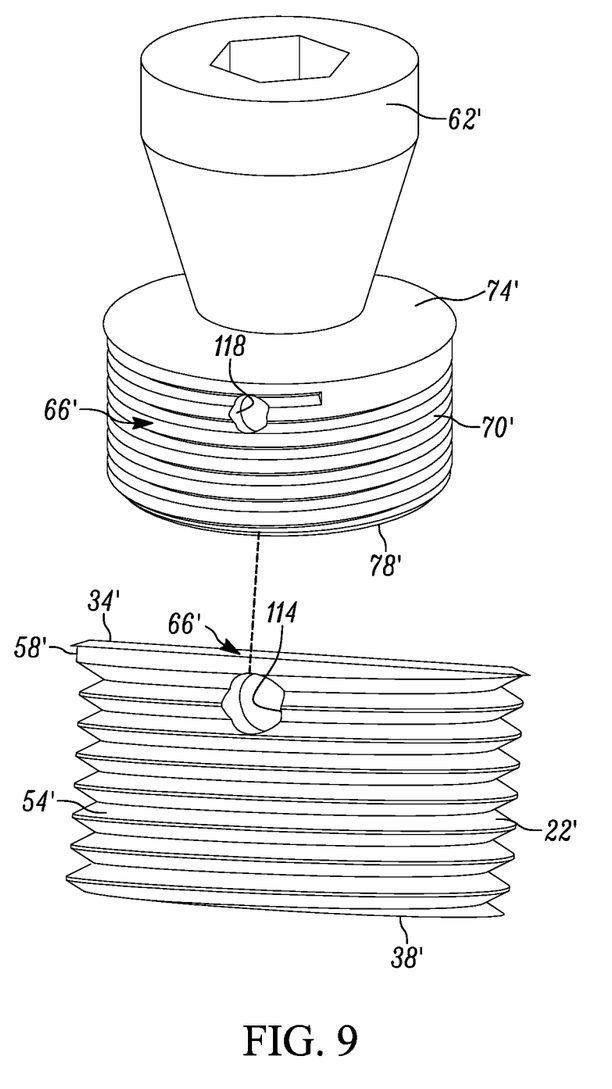
FIG. 9 is an exploded view of a fastener according to another embodiment.

FIG. 9 shows a fastener according to another embodiment. A shearable section 66' may include a shear pin (not shown) for co-rotation of the first portion 18' and the second portion 22'. Specifically, the first portion 18' may include an aperture 114 positioned near the upper end 34', and the base 70' may include a corresponding aperture 118 near the upper end 74'. The shear pin can extend through the apertures 114, 118 to couple the first portion 18' and the second portion 22' together for co-rotation. Furthermore, the shear pin will break or shear upon application of a predetermined torque after a non-threaded section 58' of the first portion 18' engages the threads 60 of the opening 42. After the shear pin breaks, the second portion 22' can rotate relative to the first portion 18'.

FIGS. 10-13 illustrate a fastener 410 according to yet another embodiment. Features of fastener 410 that are similar to features of the fastener 10 are identified with similar reference numbers, plus 400. At least some differences between the fastener 410 and the fastener 10 are described in detail.

Figure 10:
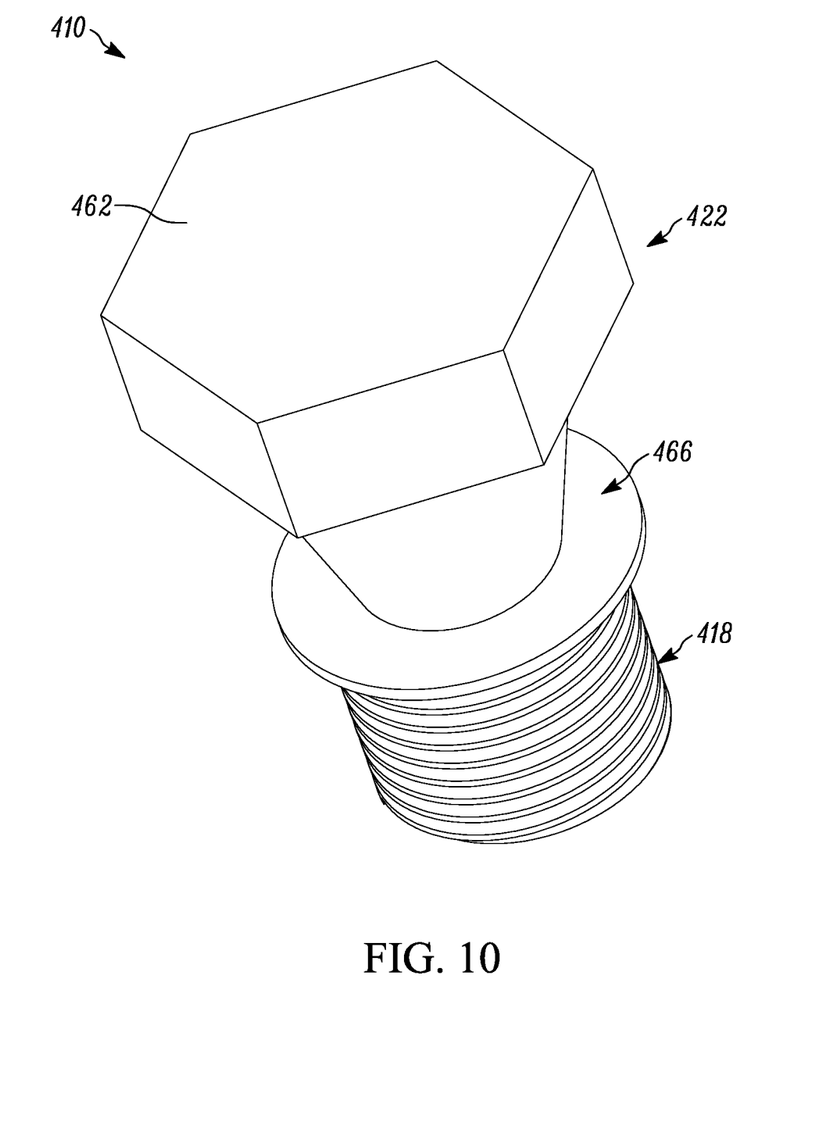
FIG. 10 is a perspective view of a fastener according to yet another embodiment.
Figure 11:
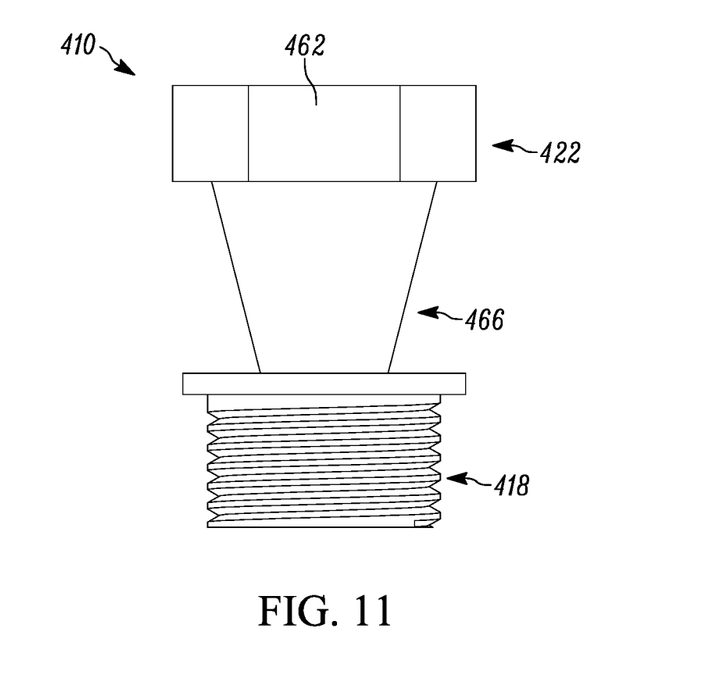
FIG. 11 is a side view of the fastener of FIG. 10.
Figure 12:
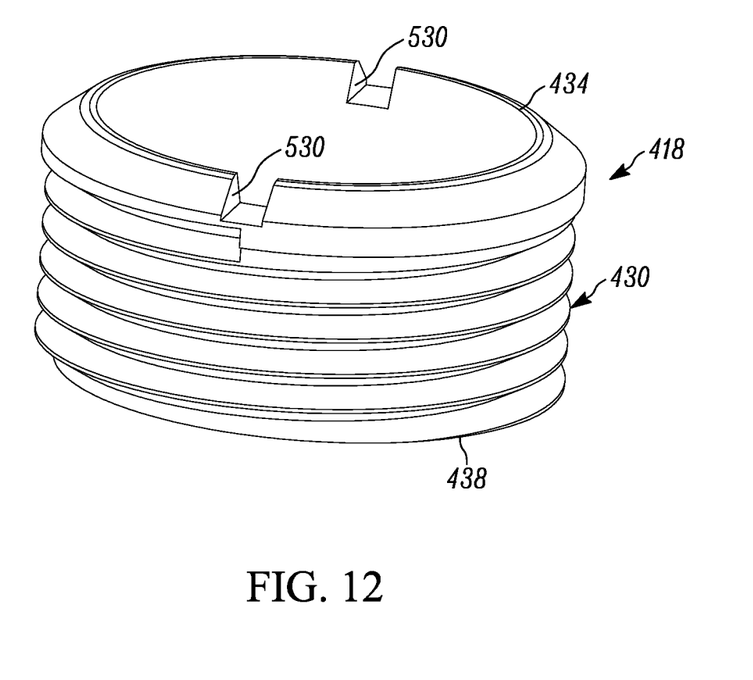
FIG. 12 is a perspective view of a second portion of the fastener of FIG. 10.
Figure 13:
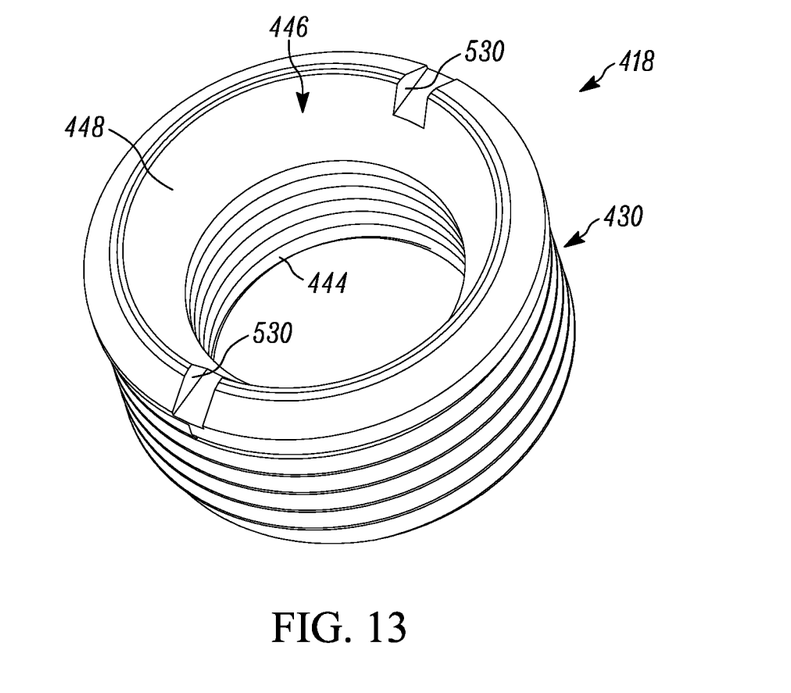
FIG. 13 is a perspective view of a second portion of the fastener of FIG. 10.

As shown in FIGS. 10 and 11, the second portion 422 has an outer hex-shaped profile but does not include a socket extending through the head 462 and shearable section 466. Also, as shown in FIGS. 12 and 13, notches or slots 530 are positioned adjacent one end (e.g., an upper end 434) of a cylindrical body 430 of the first portion 418. The slots 530 are configured to engage a tool (e.g., a keyed wrench) to permit a user to rotate both the first portion 418 and the second portion 422 to remove the fastener 410 from an opening 42 of a connector block 14 (FIG. 2). Also, as shown in FIG. 13, a portion 444 of an inner surface 446 of the first portion 418 proximate a lower end 438 (e.g., an end proximate an inner portion of the connector block 14) includes threads, while a portion 448 of the inner surface 446 between the threaded portion 444 and an upper end 434 is smooth.

The embodiments described above and illustrated in the figures are presented by way of example only and are not intended as a limitation upon the concepts and principles presented herein. As such, it will be appreciated that variations and modifications exist within the scope and spirit of one or more independent aspects as described.

What is claimed is:

1. A fastener for connecting an electrical conductor to a connector body, the fastener comprising:
   a first portion adapted to engage an opening of the connector body;
   a second portion engaging the first portion, the second portion including,
   a head;
   a base coupled to the first portion, the base including an end adapted to engage the electrical conductor; and
   a shearable section positioned between the head and the base,
   wherein the first portion includes an end surface positioned proximate the opening of the connector body, the end surface including at least one feature configured to receive a tool to facilitate rotation of the first portion relative to the connector body.

2. The fastener of claim 1, wherein the base is threadable into the first portion to progressively insert the end into the connector body until the end contacts an outer surface of the electrical conductor.

3. The fastener of claim 1, wherein the first portion includes an outer surface having a threaded section and a non-threaded section, the non-threaded section providing a stop to prevent over insertion of the first portion into the opening beyond a predetermined point.

4. The fastener of claim 3, wherein the non-threaded section is configured to position an upper end of the first portion flush with the outer surface of the connector body.

5. The fastener of claim 1, wherein an end of the base includes a flange, wherein the flange engages an upper end of the first portion for rotating the first portion and the second portion together.

6. The fastener of claim 5, wherein the flange is separable from the base due to threading the second portion relative to the first portion after the first portion is inhibited from further rotation, and wherein the second portion is further threadable into the first portion after the flange is separated from the base.

7. The fastener of claim 1, further comprising a fixed break off point positioned at an end of the shearable section and adjacent the base, and wherein the head separates from the base at the fixed break off point when a predetermined torque limit is reached.

8. The fastener of claim 1, wherein the shearable section includes an aperture and the base includes a corresponding aperture, the fastener further comprising a shear pin extending through the apertures, and wherein the shear pin is configured to shear when an upper end of the first portion is positioned adjacent an outer surface of the connector body, thereby allowing rotation of the second portion relative to the first portion.

9. The fastener of claim 1, wherein the head includes at least one of an outer hex profile and a socket, and wherein the fastener is configured to be rotated by a drive tool engaging at least one of the outer hex profile and the socket.

10. The fastener of claim 1, wherein the head includes an inner surface defining a socket, the socket extending from an end surface of the head, through the shearable section, and partially through the base to facilitate removal of the base from the connector body after the head has separated from the base.

11. The fastener of claim 1, wherein at least a portion of an inner surface of the first portion includes threads, and wherein an outer surface of the base includes threads for threadably engaging the threads on the inner surface of the first portion.

12. An electrical connector comprising:
    a connector body including at least one bore for receiving an electrical conductor, the connector body including at least one opening in communication with the bore; and
    a fastener coupled to the opening of the connector body, the fastener including,
    a first portion adapted to engage an opening of the connector body, and
    a second portion including a head, a base coupled to the first portion, and a shearable section positioned between the head and the base, the base including an end adapted to engage the electrical conductor,
    wherein the first portion includes an end surface positioned proximate the opening of the connector body, the end surface including at least one feature configured to receive a tool to facilitate rotation of the first portion relative to the connector body.

13. The connector of claim 12, wherein the first portion includes an outer surface having a threaded section and a non-threaded section, the non-threaded section providing a stop to prevent over insertion of the first portion into the opening beyond a predetermined point.

14. The connector of claim 12, wherein an end of the base includes a flange, wherein the flange engages an upper end of the first portion for rotating the first portion and the second portion together.

15. The connector of claim 14, wherein the flange is separable from the base due to threading the second portion relative to the first portion after the first portion is inhibited from further rotation, and wherein the second portion is further threadable into the first portion after the flange is separated from the base.

16. The connector of claim 12, further comprising a fixed break off point positioned at an end of the shearable section and adjacent the base, and wherein the head separates from the base at the fixed break off point when a predetermined torque limit is reached.

17. The connector of claim 12, wherein the head includes an inner surface defining a socket, the socket extending from an end surface of the head, through the shearable section, and partially through the base to facilitate removal of the base from the connector body after the head has separated from the base.

18. A method of connecting an electrical conductor to a connector body, the method comprising:

co-rotating a first portion and a second portion of a fastener to insert the first portion into an opening of the connector body, until an upper end of the first portion is substantially flush with an outer surface of the connector body;

further inserting the second portion relative to the first portion until a base end of the second portion engages the electrical connector; and shearing a head of the second portion from a base of the second portion along a predetermined shear section, wherein, after the upper end of the first portion is substantially flush with the outer surface of the connector body, the upper end of the first portion includes an end surface positioned proximate the opening of the connector body, and wherein the end surface includes at least one feature configured to receive a tool to facilitate rotation of the first portion relative to the connector body.

19. The method of claim 18, the method further comprising inhibiting rotation of the first portion when a non-threaded section of the first portion is adjacent an outer surface of the connector body.

20. The method of claim 18, wherein an end of the base includes a flange, wherein the flange engages the upper end of the first portion to couple the first portion and the second portion for co-rotation.

21. The method of claim 20, further comprising breaking the flange from the base when the upper end of the first portion is substantially flush with the outer surface of the connector body.

22. The method of claim 21, wherein, after breaking the flange, the second portion rotates relative to the first portion to progressively insert the second portion through the first portion.

* * * * *